(12) United States Patent
Vahabzadeh et al.

(10) Patent No.: US 7,586,083 B2
(45) Date of Patent: Sep. 8, 2009

(54) LASER SENSOR APPARATUS AND METHOD FOR DETECTING TRANSMISSION SHAFT TORQUE

(75) Inventors: Hamid Vahabzadeh, Oakland, MI (US); Ayoub Chakari, Strasbourg (FR)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/952,240

(22) Filed: Dec. 7, 2007

(65) Prior Publication Data

US 2008/0156972 A1  Jul. 3, 2008

Related U.S. Application Data

(60) Provisional application No. 60/883,244, filed on Jan. 3, 2007.

(51) Int. Cl.
*G02F 1/01* (2006.01)
*G01L 3/00* (2006.01)
*G01L 1/24* (2006.01)

(52) U.S. Cl. ............. 250/225; 250/231.13; 73/862.324; 73/862.624; 356/364; 356/370

(58) Field of Classification Search ................. 250/225, 250/231.13, 231.14; 73/114.15, 862.08, 73/862.21, 862.23, 862.324, 862.624; 356/364, 356/370
See application file for complete search history.

(56) References Cited

U.S. PATENT DOCUMENTS

| | | | | |
|---|---|---|---|---|
| 3,596,100 A | * | 7/1971 | Hollick | 73/862.324 |
| 3,907,431 A | * | 9/1975 | McDougal | 356/364 |
| 3,938,890 A | * | 2/1976 | Flavell | 356/370 |
| 3,950,987 A | * | 4/1976 | Slezinger et al. | 73/862.624 |
| 4,263,810 A | * | 4/1981 | Chiu | 73/800 |
| 4,874,245 A | * | 10/1989 | Spillman et al. | 356/364 |
| 5,389,780 A | * | 2/1995 | Anderson | 250/225 |
| 5,540,108 A | * | 7/1996 | Cook et al. | 73/862.041 |
| 6,915,710 B2 | * | 7/2005 | Nicholson | 73/862.324 |
| 2007/0056387 A1 | * | 3/2007 | Obikawa | 73/862.324 |

* cited by examiner

*Primary Examiner*—Stephen Yam
(74) *Attorney, Agent, or Firm*—Quinn Law Group, PLLC

(57) ABSTRACT

Presented herein is a non-contact torque sensing apparatus and method for measuring the instantaneous torque, or torsional stress/strain, transmitted through an elongated power transmission member such as a rotatable shaft. Polarized light is directed along a measurement light path in a cavity of a shaft where it intercepts a polarizing filter. The polarizing filter is operable to alter the polarization angle of the light according to torsional twisting of the shaft. A measurement device measures the change in the polarization angle of the light to obtain the shaft twist angle. Shaft torque is then calculated from the twist angle.

12 Claims, 7 Drawing Sheets

US 7,586,083 B2

LASER SENSOR APPARATUS AND METHOD FOR DETECTING TRANSMISSION SHAFT TORQUE

CROSS REFERENCE TO RELATED APPLICATIONS

This application claims the benefit of U.S. Provisional Patent Application No. 60/883,244, filed Jan. 3, 2007 entitled "LASER TORQUE SENSOR FOR TRANSMISSIONS" and which is hereby incorporated by reference in its entirety.

TECHNICAL FIELD

The present invention is directed to a sensor or apparatus for the non-contact measurement of torsional stress in a power transmitting rotating shaft, one such example being the input or output shaft of a transmission, by measuring changes in at least one property of light transmitted along the shaft to determine the torque transmitted by the shaft.

BACKGROUND OF THE INVENTION

When torque is applied to a shaft, stress is applied along helical lines of compression and tension along the surface of the shaft. Various methods are known for measurement of the torque in a shaft. One method is to bond strain gauges to the exterior surface of the shaft with the strain gauges positioned in a cross configuration. The strain gauges function as elements of a resistive bridge circuit measuring compression and tension in the shaft surface along their length as the shaft torsionally twists. Torque measurement in a rotating shaft can be a challenge to implement when using strain gauges as the sensing elements as the strain gauges necessarily need to interface electrically with other off-shaft electronics. The off-shaft electronics are necessary to perform the resistance bridge measurements so as to detect and quantify tension and compression resulting from torsional twisting of the shaft as indicative of transmitted shaft torque.

Transmitted torque in a shaft may also be determined by measurement of the angular displacement between two gears mounted to the shaft in a distally spaced relationship along the axis of rotation of the shaft. Using this method, the angular displacement between spaced gears is indicative of the twist angle over the length of the shaft between the gears, the twist angle being indicative of torque transmitted along the shaft.

SUMMARY OF THE INVENTION

The present invention is directed to a non-contact sensor or apparatus for measuring the instantaneous torque, or torsional stress/strain, transmitted through an elongated power transmission member such as a rotatable shaft, such as (for example) a shaft driveably coupling an engine to a vehicle transmission, or within the transmission, or elsewhere within a vehicle drivetrain. In accordance with the disclosed invention, a rotatable shaft is provided with a cavity in a portion of a length of the shaft between a first portion of the shaft and a second portion of the shaft. A light source is provided emitting polarized light along a measurement light path in the cavity from the first portion of the shaft to the second portion of the shaft. A polarizing filter is provided and secured in the cavity in the second portion of the shaft. The polarizing filter is operable to change the angular polarization of light in the polarized light beam. A measurement device is provided to detect the change in the polarization angle in the light path as introduced by the polarizing filter. When torque is transmitted by the shaft, the transmitted torque causes elastic twisting in the shaft about the axis of rotation of the shaft. The torsional twisting of the shaft results in an angular rotation of the polarizing filter relative to the polarization direction of the polarized light beam and thereby results in a change in polarization angle of the light passing through the polarizing filter. This change in polarization angle is detected and is indicative of transmitted torque in the shaft, providing the basis by which the transmitted torque in the shaft may be calculated, as will be discussed more fully in later sections herein.

According to one aspect of the invention, the light source is a laser light source, the light source includes a light-polarizing filter to provide a coherent single wavelength polarized light beam to transmit along the measurement light path.

According to another aspect of the invention, the torque sensor apparatus includes a beam splitter configured to split the light beam from the light source into two light beams, one following the measurement light path and one following a reference light path. The beam splitter provides a reference light path having an angular polarization determined by angular polarization of light from the light source. In this aspect of the invention the measurement device detects the change in polarization angle as a detected difference in the angular polarization of the reference light path and angular polarization of the light after the polarizing filter. The detected difference in angular polarization is indicative of the torsional twisting in the shaft and therefore the torque transmitted by the shaft.

According to another aspect of the invention, the light source in the torque sensor apparatus is a laser light source that includes a second light-polarizing filter to polarize light emitted by the light source. The light source is positioned external to the shaft rather than within the cavity of the shaft. Polarized light from the second polarizing filter is directed to enter the shaft cavity through an entrance aperture in the first portion of the shaft. The entrance aperture extends through the wall of the shaft between the cavity and the outside surface of the shaft. The torque sensor apparatus further includes a first reflectance element secured within the first portion of the shaft cavity and configured to redirect the polarized light from the entrance aperture in a direction so as to intercept the polarization filter provided in the cavity in the second portion of the shaft cavity. A second reflectance element is also secured within the shaft cavity and configured to redirect polarized light leaving the polarization filter in the cavity to exit the shaft through an exit aperture in the shaft. The measurement device is positioned outside the shaft and is aligned to detect polarized light emitted through the exit aperture. The entrance aperture and the exit aperture are aligned on the shaft to permit light from the light source mounted external to the shaft to redirect through the cavity and reach the measurement device when the shaft is in at least one angular position of shaft rotation.

According to another aspect of the invention, the first reflectance element includes a first metallic tube into which the first reflectance element is mounted. Similarly, the second reflectance element includes a second metallic tube into which the second reflectance element is mounted. The first and second metallic tubes are sized and fitted to secure to the shaft within the cavity of the shaft.

According to another aspect of the invention, the shaft cavity is a portion of an axial bore through one end of the shaft, the axial bore providing access to the cavity for installation of the first reflectance element and the second reflectance element through the end bore of the shaft.

According to another aspect of the invention, the first reflectance element includes a first reflective surface configured to redirect the polarized light from the entrance aperture by reflection along a length of the shaft cavity to the polarization filter in the shaft cavity. The second reflectance element includes a second reflective surface configured to redirect the polarized light from the polarization filter in the cavity to exit the shaft cavity through an exit aperture in the shaft by reflection.

According to another aspect of the invention, the reflective surfaces of the first and second reflectance elements are substantially planar reflective surfaces.

According to another aspect of the invention, the reflective surfaces of both the first and second reflectance elements are each a conical reflective surface.

According to another aspect of the invention, a half wave plate is provided and positioned after the light source and the second polarizing filter and before the beam splitter. The effect of the half wave plate yields a doubling in the sensitivity of the measurement device in detecting shaft torque, as will be explained more fully later.

According to another aspect of the invention, the change in polarization angle of light leaving the polarization filter located in the shaft cavity results in a change in the intensity of light exiting the exit aperture of the shaft and reaching the measurement device. In this aspect of the invention, the measurement device is configured and adapted to detect and utilize this change in light intensity to determine the change in polarization angle of light reaching the measurement device from the shaft exit aperture. Additionally, the measurement device is configured to detect changes in the intensity of light in the reference light path and correct the measured intensity of light from the shaft exit aperture according to measured changes in reference light path intensity to cancel out variations in the intensity of light emitted by the light source.

Additionally, a method is disclosed for the measurement of torque transmitted by a shaft in accordance with the foregoing apparatus of the invention, as will be explained more fully later herein.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The drawings show a form of the invention that is presently preferred; however, the invention is not limited to the precise arrangement shown in the drawings.

DESCRIPTION OF THE PREFERRED EMBODIMENTS

Figure 1:
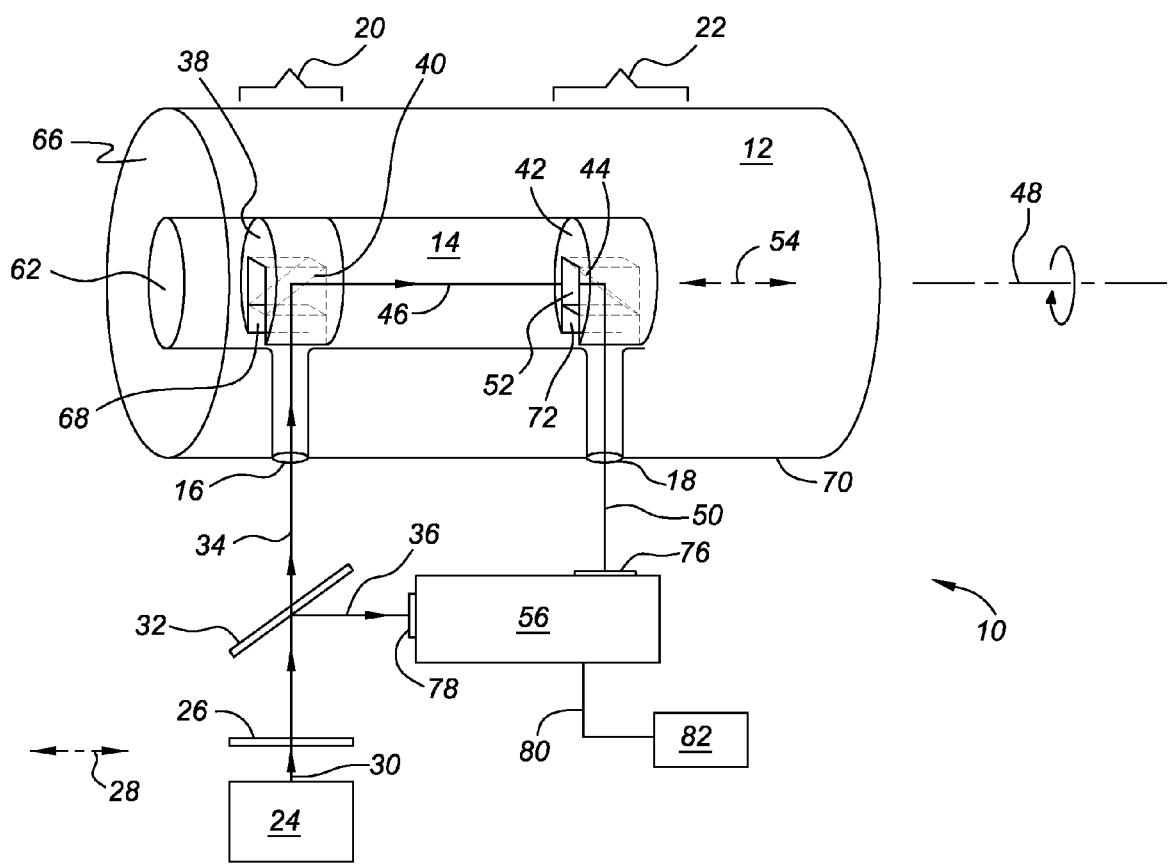
FIG. 1 illustrates a schematic side perspective view of one embodiment of a laser torque sensor applied to measure transmitted torque in a shaft, depicting reflectance elements secured into a bore as well as other components of the laser torque sensor, consistent with the present invention.

FIG. 1 illustrates a schematic side perspective view of one embodiment of a laser torque sensor 10 applied to measure instantaneous torque, or torsional stress/strain transmitted by a rotatable shaft 12. In accordance with the disclosed invention, the rotatable shaft 12 is provided with a cavity 14 in a portion of a length of the shaft between a first portion 20 of the shaft 12 and a second portion 22 of the shaft 12. In the illustrated embodiment, the cavity 14 is a portion of the axial bore 62 in the shaft 12. The laser torque sensor 10 further includes a first reflectance element 38 and second reflectance element 42 each secured into the cavity 14 in the shaft 12. The reflectance elements 38, 42 are installable into the cavity 14 of the shaft 12 through the opening of the bore 62 provided on a first end 66 of the shaft 12. The first reflectance element 38 is secured in the cavity 14 at a first portion 20 of the shaft 12 while the second reflectance element 42 is secured in the cavity 14 in a second portion 22 of the shaft 12 where the second portion 22 is spaced apart from the first portion 20 by some defined distance. The shaft 12 includes a light entrance aperture 16 in the first portion 20 of the shaft 12 and a light exit aperture 18 in the second portion 22 of the shaft 12. Each aperture 16, 18 extends from an outside surface 70 of the shaft 12 into the cavity 14 of the shaft 12. In the embodiment illustrated in FIG. 1, the first reflectance element 38 and second reflectance element 42 each have a generally 'C' shaped housing. The use of a 'C' shaped housing is specific to exemplary embodiment of FIG. 1 and is not limiting. The reflectance elements 38, 42 may include any shape of housing or alternately no housing at all as long as the reflectance elements 38, 42 are securable to the shaft 12 within the cavity 14. The 'C' shaped housing of the first reflectance element 38 is secured into the cavity 14 with the opening 68 of the 'C' aligned with the light entrance aperture 16 of shaft 12. Similarly, the 'C' shaped housing of the second reflectance element 42 is secured into the cavity 14 with the opening 72 of the 'C' aligned with the light exit aperture 18.

The laser torque sensor 10 includes a light source 24 emitting light along a first light path 30. In FIG. 1, the light source 24 is secured proximate to and separate from the shaft 12 such that the shaft 12 is free to rotate about an axis of rotation 48 independent of light source 24. The laser torque sensor includes a polarizing filter 26 positioned proximate to the light source 24. In certain embodiments of the light source 24, the polarizing filter 26 may be included as part of the light source 24. The polarizing filter 26 is positioned to intercept the first light path 30 emitted by light source 24 and to polarize the light leaving the polarizing filter 26 along the polarized portion 74 of the first light path 30 in an angular direction of a first axis of polarization 28. The laser torque sensor 10 further includes a beam splitter 32, such as (for one non-limiting example) a light-transparent planar plate with a partially reflective mirror-like coating. The beam splitter 32 is adapted to transmit a defined percentage of the light incident upon the beam splitter 32 into a first measurement light path 34 and to reflect substantially the remaining percentage of incident light along a reference light path 36. The first measurement light path 34 is positioned and directed towards the shaft 12 so as to be alignable with the entrance aperture 16 by rotation of the shaft 12 about the axis of rotation 48, wherein the first measurement light path 34 enters the cavity 14 through the light entrance aperture 16. In the first portion 20 of the shaft 12, the first reflectance element 38 includes a first reflective surface 40 configured to reflect polarized light in the first measurement light path 34 to a second measurement light path 46 directed along a length of the cavity 14 in a direction substantially parallel to the axis of rotation 48 of the shaft 12 so as to impinge upon the second reflective surface 44 of second reflectance element 42 secured in the second portion 22 of the shaft 12. The laser torque sensor 10 additionally includes a polarizing filter 52 positioned in the second portion 22 of the shaft 12 and secured to the 'C' shaped housing of the second reflectance element 42. Again, the 'C' shape of the housing is specific to the exemplary embodiment illustrated in FIG. 1 and is not limiting, as discussed earlier. The polarizing filter 52 is positioned to intercept polarized light in the second measurement light path 46 before it reaches the second reflective surface 44. As the polarizing filter 52 is secured to the second reflectance element 42 which is then secured within the second portion 42 of the shaft 12, the polarizing filter 52 is thereby constrained to rotate in unison with the second portion 22 of shaft 12. The polarizing filter 52 has a second axis of polarization 54 by which it polarizes light in the second measurement light path 46 passing through the polarizing filter 52. The second reflectance surface 44 is configured to reflect light polarized by the polarization filter 52 along a third measurement light path 50 which exits the shaft 12 through the light exit aperture 18. The exit aperture 18 is positioned and configured to align the third measurement light path 50 with a measurement light-sensing portion 76 of a measurement device 56 by rotation of the shaft 12 about the axis of rotation 48. The exit aperture 18 and entrance aperture 16 are cooperatively aligned such that when the entrance aperture 16 is rotatably aligned to permit light in the first measurement light path 34 to enter the entrance aperture 16, then also the exit aperture 18 is aligned to permit light in the third measurement light path 50 to reach the measurement light sensing portion 76 of the measurement device 56 so that light can complete the measurement circuit from the light source 24 through the shaft cavity 14 to the measurement device 56. Similarly, light from the reference light path 36 impinges upon the reference light-sensing portion 78 of the measurement device 56. The measurement device 56 is positioned to receive light from the third measurement light path 50 and to detect a difference in polarization angle of the light between the third measurement path 50 and the reference light path 36. Torque transmitted by the shaft 12 results in angular twisting of the shaft 12, which results in a change in the polarization angle of light in the third measurement path 50 induced by to the angular alignment of the axis of polarization 54 of the second polarizing filter 52. Torsional twisting in the shaft 12 is detected as a difference in polarization angle between the reference light path 36 and the third measurement light path 50 by the measurement device 56. This change in polarization angle is directly related to the torque transmitted by the shaft 12, as will be discussed in detail in a later portion of this application. The measured torque, determined from the measured difference in polarization angle, is output as an electronic measurement signal 80. The electronic measurement signal 80 may be any of: a digital electronic signal representing torque, an analog voltage signal representing torque, an analog current signal representing torque, as well as other signal output types as would be known to one skilled in the art. The torque signal may be presented in a human readable form by, for example, an analog or digital torque indicator 82, or provided as an input to an on-board vehicle engine management or transmission management computer, as well as provided as an input to other devices or for other uses as would be known to one skilled in the art. The light source 24 is preferably a laser light source.

It is to be understood that the cavity 14 may occupy only a portion of the length of the shaft 12, the cavity 14 providing space within the shaft 12 to hold reflectance elements 38, 42. Additionally, the presence in the shaft 12 of the cavity 14 in the illustrated embodiment as well as in other embodiments necessarily reduces the material cross section of the shaft 12 around the cavity 14, making the cavity portion of the shaft 14 more susceptible to torsional twisting and thereby improving the accuracy and sensitivity of shaft torque measurements.

Figure 2:
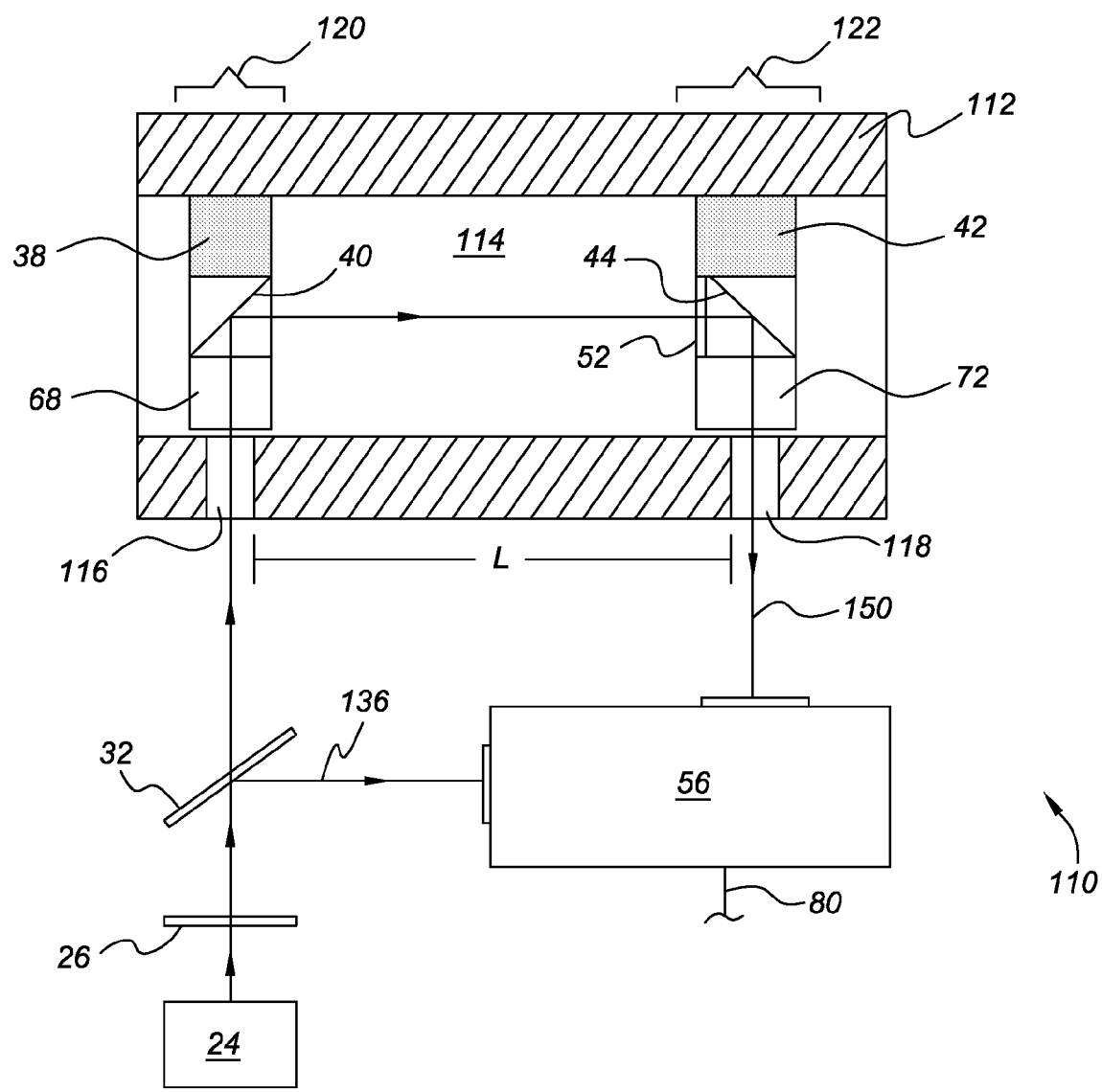
FIG. 2 illustrates a schematic sectional view of another embodiment of the laser torque sensor applied to measure transmitted torque in a shaft, consistent with the present invention.

FIG. 2 illustrates a schematic view of the components of the laser torque sensor of FIG. 1 applied to a tubular shaft wherein the cavity 114 extends completely through the length of the shaft 112. As in FIG. 1, the laser torque sensor 110 includes the light source 24, polarizing filter 26, beam splitter 32, light entrance aperture 116, light exit aperture 118, first reflectance element 38 secured within the first portion 120 of the shaft 112, second reflectance element 42 secured within the second portion 122 of the shaft 112, polarizing filter 52, and measurement device 56 configured to provide a measured torque signal 80 as an output. FIG. 2 provides a better illustration of the preferred mounting of the second polarizing filter 52 secured immediately in front of the reflective surface 44 of the second reflectance element 42 within the second portion 122 of the shaft. The measurement device 56 is configured to measure torsional twisting of the shaft 112 substantially over the length L between the first portion 120 and the second portion 122 of the shaft. This measured angular twist is converted to a shaft torque measurement, as will be discussed later in this application. Other than noted above, the operation of laser torque sensor 110 is identical to previous laser torque sensor discussions presented with FIG. 1.

Figure 3:
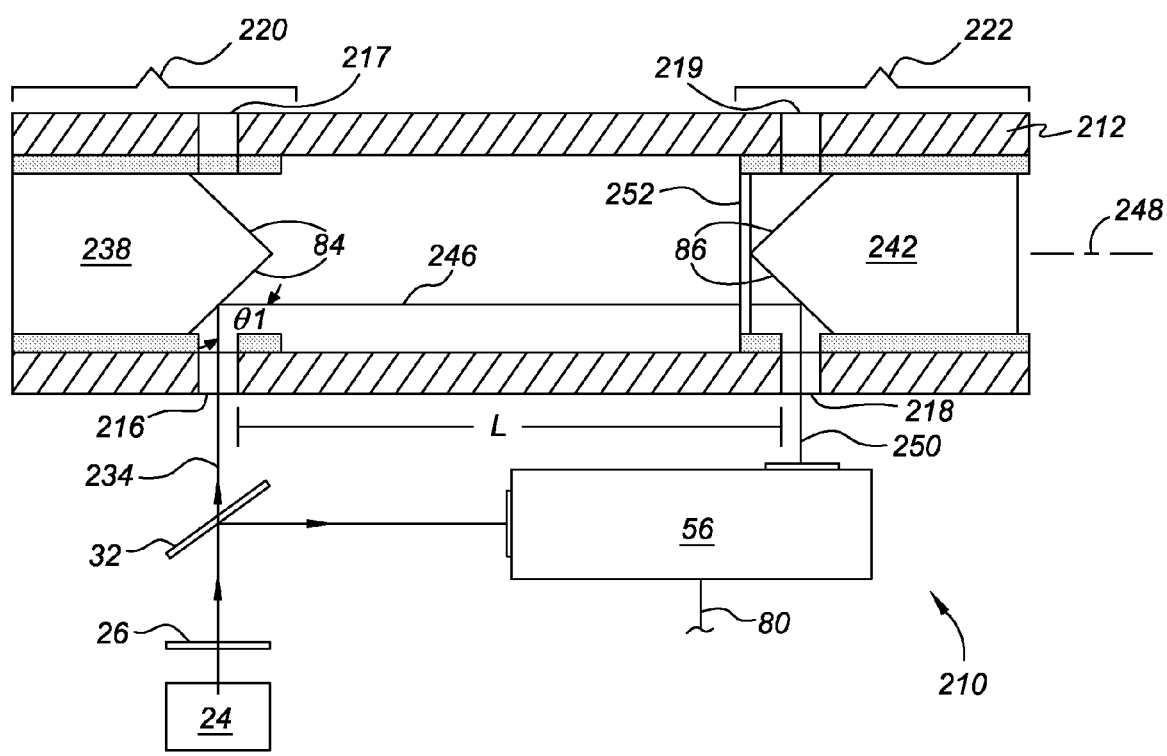
FIG. 3 illustrates a schematic sectional view of yet another embodiment of a laser torque sensor applied to measure transmitted torque in a shaft in which the reflectance elements are adapted to permit the use of a plurality of entrance and exit apertures in the shaft, consistent with the present invention.

FIG. 3 illustrates a schematic sectional view of yet another embodiment of a laser torque sensor 210 applied to measure transmitted torque in a shaft 212 in which the reflectance elements 238, 242 have light reflective surfaces 84, 86 respectively. The reflectance elements 238, 242 may be made of a plastic or metallic material. In one embodiment, the light reflective surfaces 84, 86 are cone shaped surfaces machined, formed or otherwise disposed onto reflectance elements 238, 242. In another embodiment the reflective surfaces 84, 86 each consist of two angled planar surfaces having a triangular profile when viewed from a side as depicted in FIG. 3. In yet another embodiment, the reflective surfaces 84, 86 each consist of four angled planar surfaces forming a pyramid shape and having a side profile as shown in FIG. 3. In all cases, the reflective surfaces 84, 86 are angled substantially at 45 degrees relative to the axis of rotation 248 of the shaft 212 such that the angle θ1 between the first measurement light path 234 and the reflected second measurement light path 246 is substantially 90 degrees. The same angular relationship also existing between the second measurement light path 246 and the third measurement light path 250. As discussed earlier with FIG. 2, the measured angular twist of the shaft 212 occurs over the length L between the first portion 220 and second portion 222 of the shaft 212. As discussed with FIGS. 1 and 2, laser torque sensor 210 includes light source 24, polarizing filter 26, beam splitter 32, light entrance apertures 216, 217, light exit apertures 218, 219, polarizing filter 252 and measurement device 56 configured and adapted to provide a measured torque signal 80 as an output. The use of reflective surfaces 84, 86 having a triangular profile is particularly useful when the shaft 212 is provided with one pair of light entrance/exit apertures 216, 218 respectively, or with two opposing pairs of light entrance/exit apertures (216, 217) and (218, 219) respectively. Similarly, the use of reflective surfaces 84 having a pyramid shape with four angled planar surfaces each is particularly useful when the shaft 212 is provided with up to four pairs of light entrance/exit apertures (not shown) in which neighboring aperture pairs are provided at positions located 90 degrees apart radially about the circumference of the shaft 212. When the reflective surfaces 84, 86 are cone shaped, they are suitable for use in shafts having any number of entrance apertures (not shown) and exit apertures (not shown).

Figure 4:
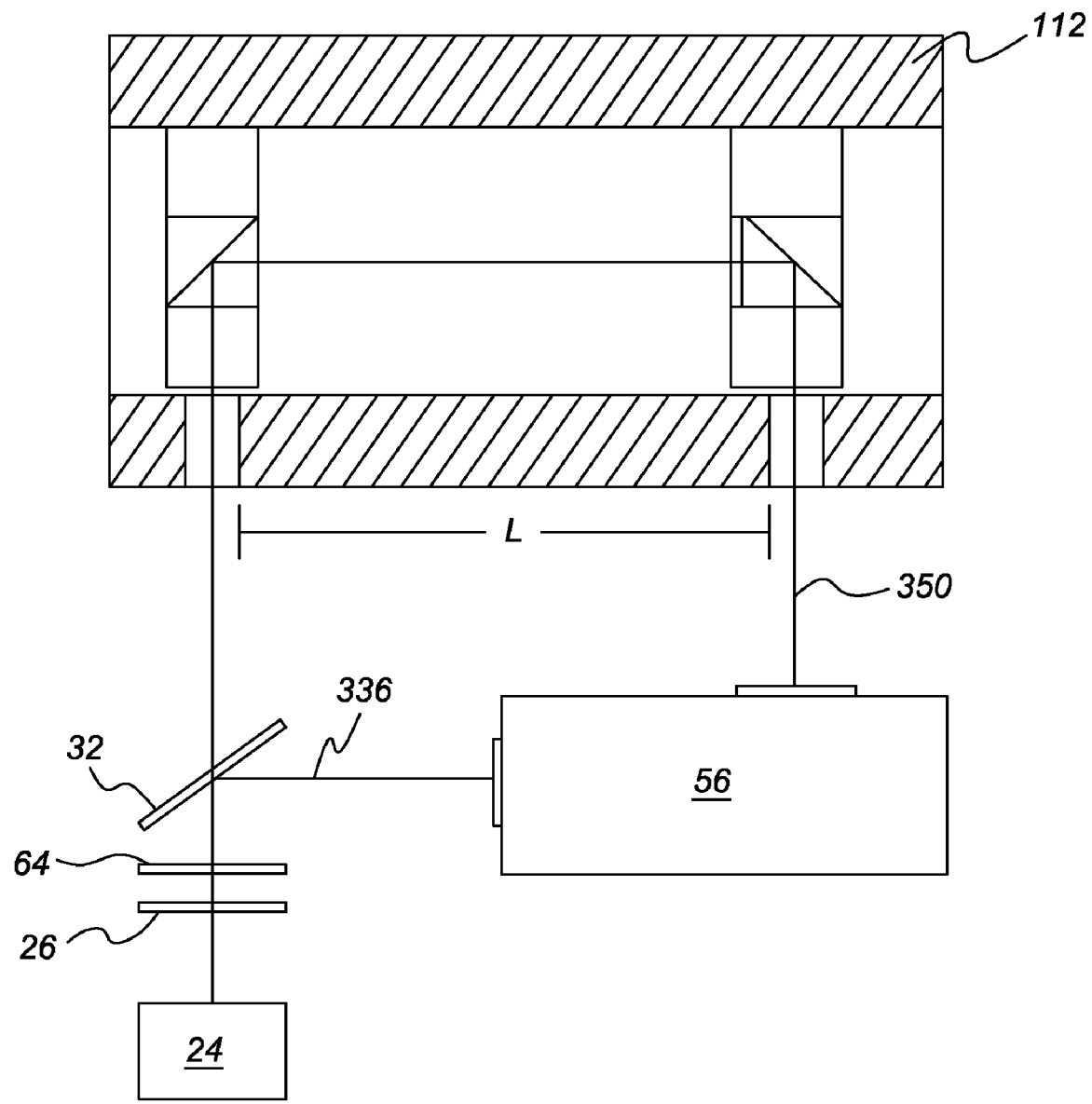
FIG. 4 illustrates a schematic view of the laser torque sensor of FIG. 2 further including a half wave plate to effectively double the sensitivity of the torque sensor, consistent with the present invention.

FIG. 4 illustrates a schematic view of the laser torque sensor 110 of FIG. 2 further including a half wave plate 64 positioned between the polarizing filter 26 and the beam splitter 32. The half wave plate 64 effectively doubles the sensitivity of the measurement device 56 to the detection of angular twisting in the shaft 112 over the length L. This can be illustrated as follows. In the laser torque sensor 110 of FIG. 2, a torsional angular twist in the shaft over the length L of $\theta_T$ degrees (see FIG. 7A) results in a difference in polarization angle between the reference light path 336 and the third measurement light path 350 of $\theta_T$ degrees. Providing a the half wave plate 64 between the polarization filter 26 and the beam splitter 32 has the effect that a torsional angular twist in the shaft 112 over the length L of $\theta_T$ degrees now results in a difference in polarization angle between the reference light path 336 and the third measurement light path 350 of 2 $\theta_T$ degrees, exactly twice the actual angular twist of the shaft. The half wave plate 64 may be included as discussed above in any laser torque sensor embodiment of the present invention to improve torque measurement sensitivity. Other than noted above, the operation of laser torque sensor 110 of FIG. 4 is identical to the previous laser torque sensor discussions presented with FIG. 1.

Figure 5:
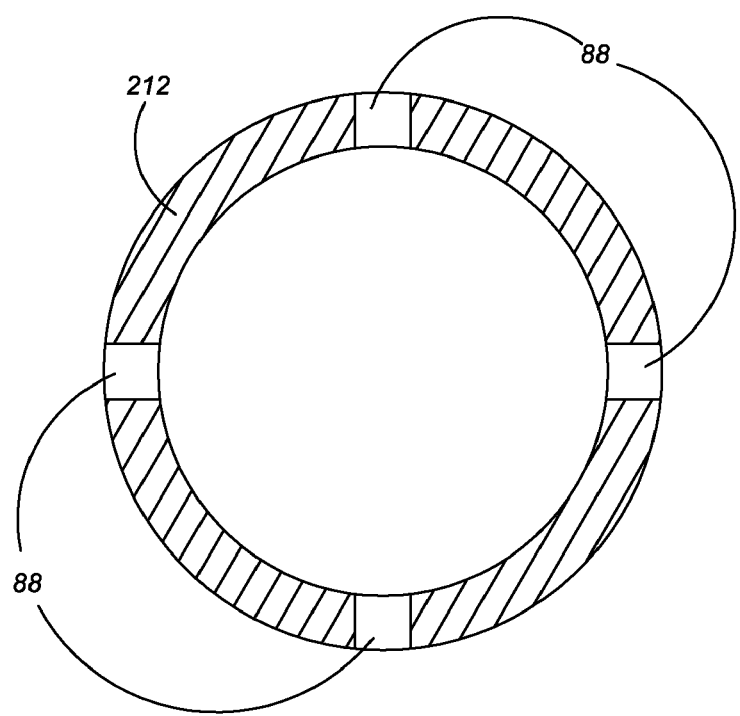
FIG. 5 illustrates a schematic section view cut through the shaft of FIG. 3 (without the reflectance elements) depicting one arrangement of the light entrance holes or light exit holes consistent with the present invention.

While FIG. 3 depicts only two entrance apertures 216, 217 and two exit apertures 218, 219, it is to be understood that it is intended and in certain cases advantageous to have multiple entrance and exit apertures positioned in a band about the circumference of the shaft 212. For example, FIG. 5 illustrates a schematic section view cut through the shaft 212 of FIG. 3 depicting one exemplary arrangement having four apertures 88 distributed about the circumference of the shaft 212, where the illustrated aperture 88 positions radially about the shaft 212 are indicative of the angular positions of light entrance and light exit apertures. As noted above, the use of multiple pairs of light entrance and exit apertures are considered to be advantageous. For example, the use of four pairs of apertures permits light to be conducted through the shaft 212 when the shaft 212 is at any one of four positions of shaft rotation, thereby permitting four measurements of shaft twist angle to be performed in each complete rotation of the shaft 212.

Figure 6:
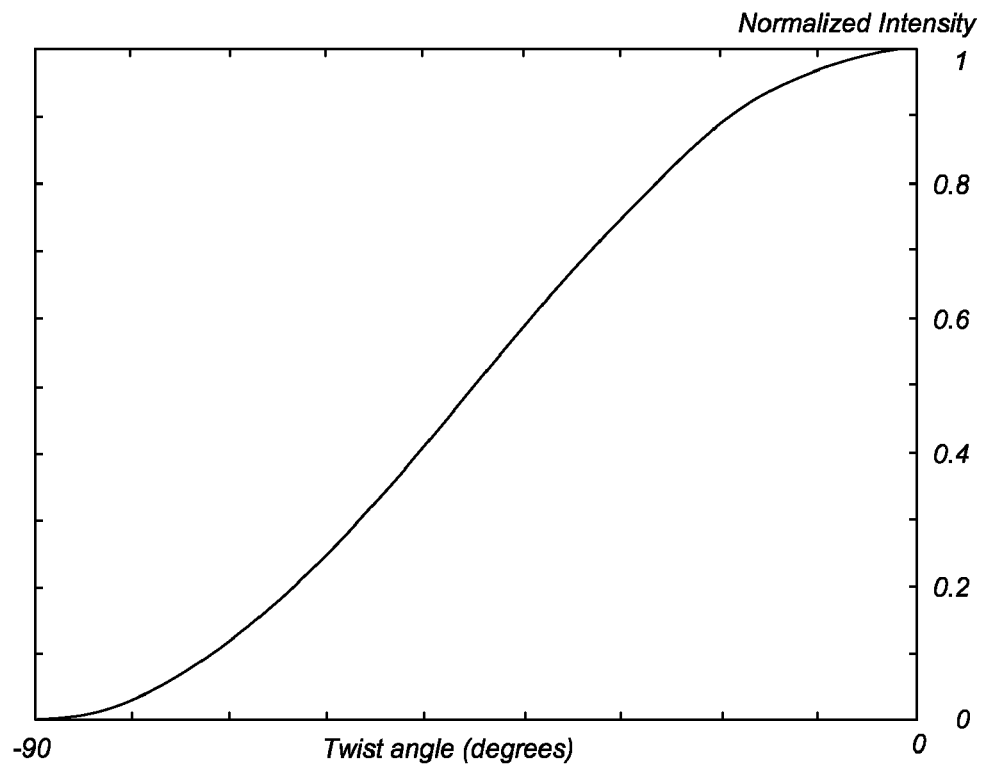
FIG. 6 is a graph depicting the general relationship between normalized intensity of light received at the light detector/sensor and shaft twist angle due to the attenuation of the intensity of polarized light in the measurement path as it passed through the polarizing filter in the shaft cavity, consistent with at least one embodiment of the present invention.
Figure 7A:
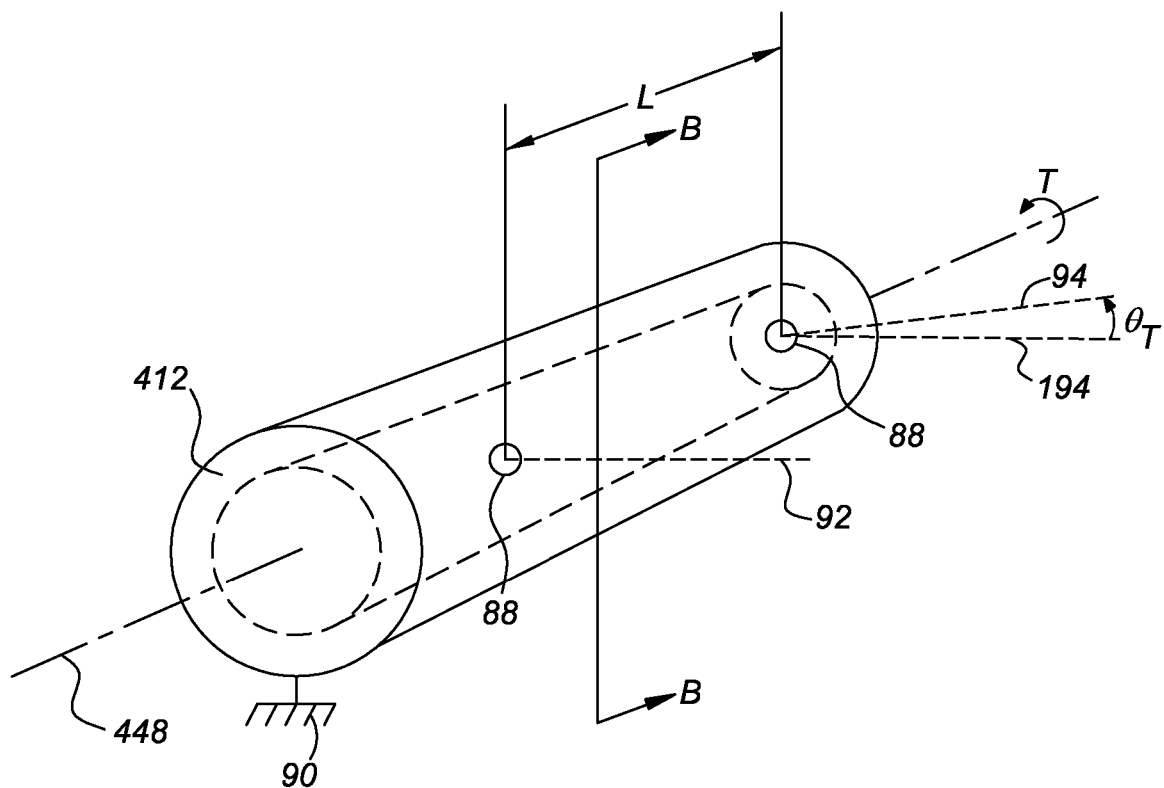
FIG. 7a is a schematic illustration of a shaft equipped with features of the present invention for torque measurement, depicted herein to support the discussion of the mathematical relationship between shaft twist angle and transmitted torque.

FIG. 6 is a graph illustrating the general relationship between the twist angle $\theta_T$ (see FIG. 7A) and the normalized intensity of the light passing through the polarizing filter 52 (see FIG. 1). It is assumed in FIG. 6 that when the twist angle $\theta_T$ is 0 degrees, then the polarization of light in measurement light paths 34, 46 (see FIG. 1) match the axis of polarization 54 (see FIG. 1) of the polarizing filter 52 (see FIG. 1). FIG. 7a illustrates a twist angle range of −90 to 0 degrees, although it is to be understood that the sign of the twist angle indicates the direction of the torque, which can be positive or negative. The magnitude of the twist angle is indicative of the unsigned magnitude of the applied torque according to the equations provided above. It is to be understood that for positive twist angles, the twist angle vs. normalized intensity curve is the same general curve as illustrated in FIG. 6 mirrored about the twist angle=0 axis.

Figure 7B:
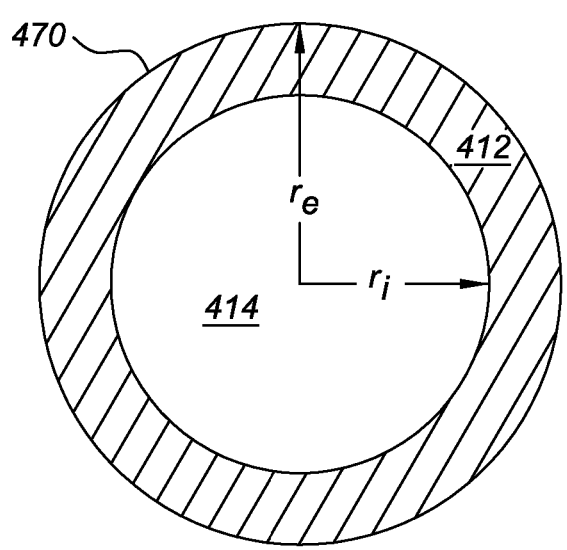
FIG. 7b is a schematic illustration of the cross section along B-B of the shaft in FIG. 7A in which only the shaft wall is illustrated to clearly label parameters used in the calculation of the moment of inertia of the cylindrical shaft section for relating twist angle to transmitted torque.

FIGS. 7A and 7B serve to further illustrate the twist angle induced into the shaft 412 by an applied torque T, and the relationship between the twist angle $\theta_T$ and the applied torque T. An understanding of this relationship is important in converting the measured shaft twist angle so as to arrive at the torque applied to the shaft. The shaft 412 in FIGS. 7A and 7B is provided with at least two spaced apertures 88 such as light entrance and exit apertures discussed in various embodiments earlier. In FIG. 7A either aperture 88 is operable as either a light entrance or light exit aperture. To facilitate discussion of the concepts, one end of the shaft 412 is depicted as connected to ground 90 so as to resist rotation while a torque T is applied to the opposing end of the shaft 412. The torque T produces a torsional twisting in the shaft 412 in the cylindrical section of the shaft between the spaced apertures 88. Each aperture 88 has an axis depicted as 92, 94 extending through the center of the aperture 88 and intersecting the axis of rotation 448 of the shaft 412. In FIG. 7A the axis 94 is also translated or copied to the aperture 88 near the applied torque T as axis 194 for easy angular comparison with the axis 94. In the embodiment illustrated in FIG. 7A, when no torque is applied to the shaft 412, the twist angle between axes 194 and 94 is zero. As torque T is applied to the shaft 412 in increasing magnitude, the twist angle $\theta_T$ increases in proportion to the applied torque.

The observed twist angle $\theta_T$ (shown as θ in equation 1 below) is related to the rigidity modulus G, the distance L between the light entrance/exit holes, the moment of inertia J of the cylindrical shaft section and the applied torque T by the following equation.

$$\theta = \frac{(T)(L)}{(J)(G)} \qquad (1)$$

For a cylindrical shaft section, the moment of inertia is given by:

$$J = \frac{\pi(r_e^4 - r_i^4)}{2} \qquad (2)$$

where $r_e$ and $r_i$ are defined in FIG. 7B, $r_i$ being the inside radius of the bore or cavity 414, and $r_e$ being the outside radius of the shaft 412 measured from the outside surface 470 of the shaft to the center of the shaft.

Then the torque is related to the shaft twist angle $\theta_T$ by the following equation:

$$G = \frac{2(T)L}{\pi(r_e^4 - r_i^4)\theta_T} \quad (3)$$

Referring again to FIGS. 1 and 7a. The polarization of light paths 34, 46, 50 and 36 are all the same when no torque is applied to the shaft (torque as discussed and illustrated with FIG. 7a). After a torque is applied to the shaft 12 in FIG. 1, the torque induces angular twisting in the shaft 12 over the length L (shown in FIG. 7A) inducing a change in polarization angle in the third measurement light path 50. This change in angular polarization is either $\theta_T$ in the torque measurement sensor configuration of FIG. 1 or is equal to $2\theta_T$ when the half wave plate 64 is present as shown in FIG. 4.

This information together with the chart of FIG. 6 enables an alternate method of indirectly detecting the change in angular polarization between the third measurement light path 50 and the reference light path 36 illustrated in FIG. 1. FIG. 6 illustrates that the normalized intensity of the light passing through the polarizing filter 52 decreases as the twist angle increases in absolute magnitude. In FIG. 1, the twist angle is exactly equivalent to the change in angular polarization between the third measurement light path 50 and the reference light path 36, as discussed earlier above. The graph of FIG. 6 provides a relationship that indicates how the intensity of the light reaching the measurement device 56 decreases as the shaft twist angle increases in absolute magnitude. Using this knowledge, the measurement device 56 may alternately be configured to indirectly rather than directly measure the shaft twist angle or change in polarization angle by measuring changes in the intensity of the light reaching the detector along the third measurement light path 50. In this configuration, the measurement device 56 monitors the intensity of light in the reference light path 36 and compensates the detected intensity of light in the third measurement light path 50 according to changes in intensity in the reference light path 36 so as to cancel out variations in the emitted light intensity of the light source 24.

Figure 8:
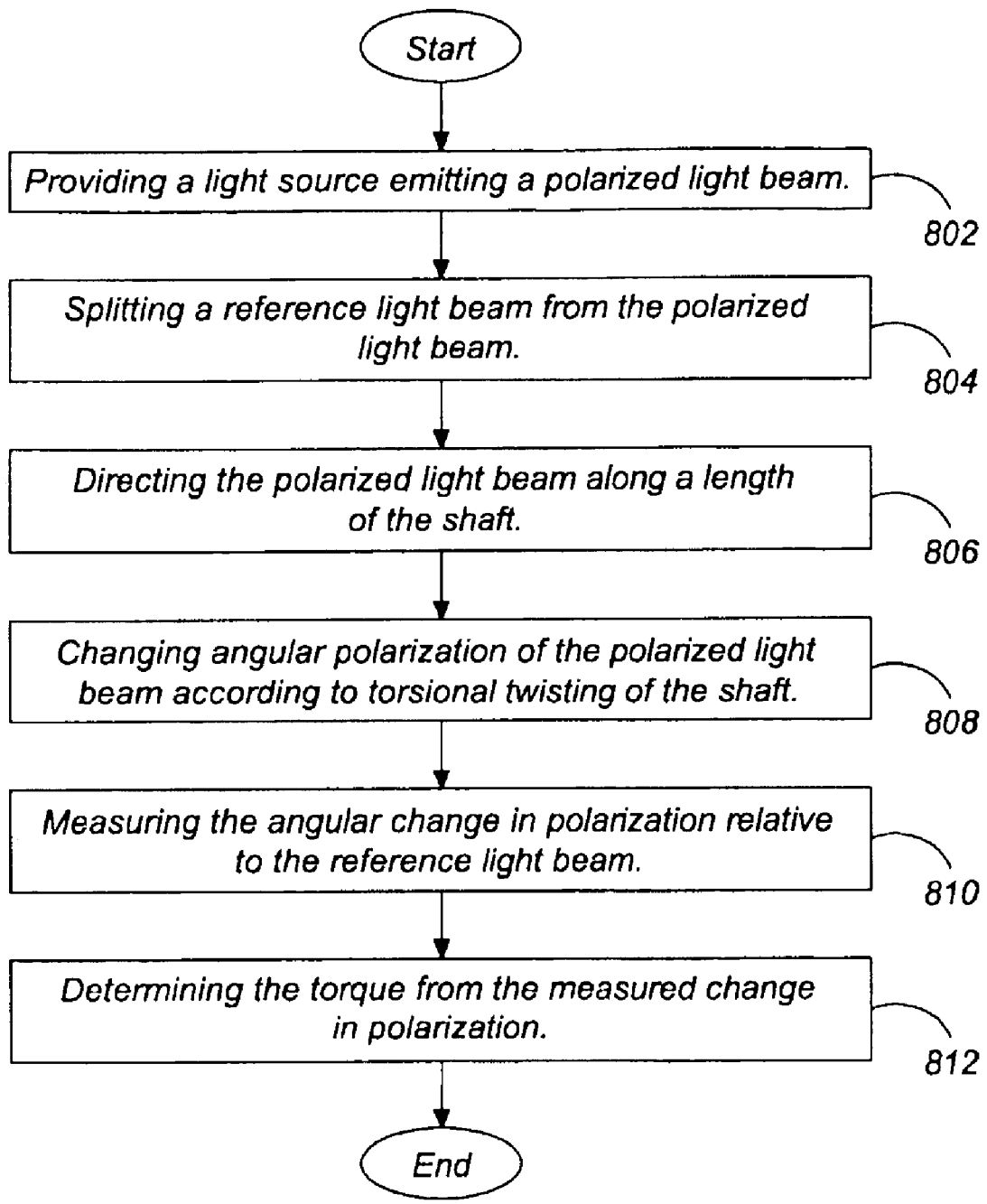
FIG. 8 depicts a method of non-contact measurement of torque transmitted in a shaft consistent with the present invention.

FIG. 8 depicts a method of non-contact measurement of torque transmitted in a shaft consistent with the present invention. The method begins at block 802 by providing a light source emitting a polarized light beam. The polarized light source is preferably a laser light source. The method continues at block 804 with splitting a reference light beam from the polarized light beam emitted by the light source. At block 806 the polarized light beam is directed along a length of the shaft. At block 808 the angular polarization of the light transmitted along the shaft is changed according to torsional twisting of the shaft. At block 810 the angular change in polarization due to torsional twisting of the shaft is measured relative to the reference light beam. At block 812 the torque is then determined from the measured change in polarization.

While the best modes for carrying out the invention have been described in detail, those familiar with the art to which this invention relates will recognize various alternative designs and embodiments for practicing the invention within the scope of the appended claims.

The invention claimed is:

1. An apparatus for measurement of transmitted torque, comprising:
   a shaft for transmitting torque having a portion of said shaft extending between a first portion of said shaft and a second portion of said shaft;
   a light source emitting polarized light along a measurement light path from said first portion to said second portion;
   a polarizing filter secured at least partially within said second portion of said shaft, said polarizing filter operable to change an angle of polarization of light in a portion of said measurement light path;
   a measurement device adapted to measure said change in polarization angle;
   wherein torque transmitted by said shaft produces twisting of said shaft, said twisting producing an angular rotation in said polarizing filter resulting in said change in polarization angle; and
   wherein said measurement device is configured to determine said transmitted torque from said measured change in polarization angle;
   a beam splitter configured to provide a reference light path split from a portion of said polarized light emitted by said light source, said reference light path having an angular polarization determined by angular polarization of light from said light source;
   wherein said measurement device measures said change in polarization angle as a difference in angular polarization between said reference light path and angular polarization of said light in said measurement light path after said polarizing filter;
   wherein said shaft has a cavity;
   wherein said light source is a laser light source positioned external to said shaft;
   wherein said measurement light path after leaving said beam splitter is directed to enter said cavity through an entrance aperture in said first portion of said shaft;
   a first reflectance element secured within a first portion of said cavity and configured to redirect said measurement light path from said entrance aperture in a direction to intercept said polarizing filter in a second portion of said cavity; and
   a second reflectance element secured within said cavity and configured to redirect polarized light leaving said polarizing filter to exit said shaft through an exit aperture in said shaft;
   wherein said entrance aperture and said exit aperture are aligned to permit light from said light source to redirect through said cavity and reach said measurement device when said shaft is in at least one angular position of rotation.

2. The apparatus of claim 1 wherein:
   said first reflectance element includes a first metallic tube into which said first reflectance element is mounted;
   wherein said second reflectance element includes a second metallic tube into which said second reflectance element is mounted; and
   wherein said first and second metallic tubes are sized and fitted to be securable to said shaft within said cavity.

3. The apparatus of claim 2, wherein:
   said cavity is formed as an axial bore through one end of said shaft and extending at least partially through an axial length of said shaft, said axial bore providing access to said cavity for installation of said first reflectance element and said second reflectance element.

4. The apparatus of claim 1, wherein:
   said first reflectance element includes a first reflective surface configured to perform said redirection of said measurement light path entering said entrance aperture; and
   wherein said second reflectance element includes a second reflective surface configured to perform said redirection of said measurement light path to exit said shaft through said exit aperture.

5. The apparatus of claim 4, wherein:
said first reflective surface is at least one substantially planar surface; and
said second reflective surface is at least one substantially planar surface.

6. The apparatus of claim 4, wherein:
said first reflective surface is a conical reflective surface; and
said second reflective surface is a conical reflective surface.

7. The apparatus of claim 4, further comprising:
a half wave plate positioned between said light source and said beam splitter;
wherein said measured change in polarization angle is equal to twice an angular twisting angle in said shaft between said first portion and said second portion of said shaft, said half wave plate doubling sensitivity of said measurement device in determining said shaft torque.

8. The apparatus of claim 4, wherein:
said change in polarization angle produces a change in intensity of light exiting said exit aperture, said change in intensity detected by said measurement device and utilized to determine said change in polarization angle; and
said detected change in intensity of light is corrected according to variations of light intensity in said reference light path, said variations in light intensity in said reference light path indicative of variations in light intensity emitted by said light source.

9. An apparatus for measurement of transmitted torque in a transmission shaft, comprising:
an elongated shaft for transmitting torque having a cavity in at least a portion of said shaft, said shaft having at least one light entrance aperture and at least one light exit aperture, said first and second apertures spaced apart along an axis of rotation of said shaft, said apertures extending from an exterior surface of said shaft into said cavity;
a light source for emitting light along a first light path, said light source secured proximate to and separate from said shaft;
a first polarizing filter positioned to intercept said first light path and having a first axis of polarization, said first polarizing filter positioned between said light source and said shaft;
a beam splitter positioned in said first light path, said beam splitter splitting said first light path into a first measurement light path and a reference light path, said first measurement light path positioned and directed towards said shaft to be alignable with said at least one of said entrance apertures by rotation of said shaft, wherein said first measurement light path enters said cavity through said at least one entrance aperture, wherein polarization of light in said reference light path is determined by polarization of light in said first measurement light path;
a first reflectance element secured to said shaft within said cavity and having a first reflective surface, said first reflective surface configured to reflect said measurement light path to a second measurement light path, said second measurement light path directed along a length of said cavity parallel to said axis of rotation of said shaft;
a second reflectance element secured to said shaft within said cavity in said second portion of said shaft and having a second reflective surface, said second reflective surface configured to reflect said second measurement light path to a third measurement light path, said third measurement light path directed to exit said cavity through at least one of said at least one exit apertures;
a second polarizing filter having a second axis of polarization, said second polarizing filter positioned to intercept and polarize light in said second measurement light path, said second polarizing filter secured in said second portion of said cavity proximate to said second reflectance element between said first reflectance element and said second reflectance element, wherein said second polarizing filter is secured to said shaft to rotate in unison with said second portion of said shaft;
a measurement device positioned to receive light from said reference light path and from said third measurement light path, said measurement device configured and adapted to detect a difference in polarization angle between said third measurement light path and said reference light path;
wherein torque transmitted by said shaft produces angular twisting in said shaft between said first portion and said second portion of said shaft, said angular twisting altering said polarization angle of light in said third measurement path relative to said reference light path;
wherein said detected difference in polarization angle is indicative of torque in said shaft by which said shaft torque may be determined.

10. The apparatus for measurement of transmitted torque of claim 9, wherein said light source is a laser light source.

11. The apparatus for measurement of transmitted torque of claim 10, further comprising:
a half wave plate positioned between said first polarizing filter and said beam splitter and intercepting light in said first light path;
wherein said difference in polarization angle between said third measurement light path and said reference light path is twice an angular twisting angle in said shaft between said first portion and said second portion of said shaft; and
wherein said half wave plate doubles sensitivity of said measurement device in determining said shaft torque.

12. The apparatus for measurement of transmitted torque of claim 10, wherein
said difference in polarization angle produces a change in intensity of light transmitted by said second polarizing filter, said change in intensity detected by said measurement device; and
wherein intensity of light in said third measurement path is corrected according to variations of light intensity in said reference light path, said variations in light intensity in said reference light path indicative of variations in light intensity emitted by said light source.

* * * * *